US005637788A

United States Patent [19]

Remboski et al.

[11] Patent Number: 5,637,788

[45] Date of Patent: Jun. 10, 1997

[54] APPARATUS AND METHOD OF DETECTING A LEAK IN AN EVAPORATIVE EMISSIONS SYSTEM

[75] Inventors: Donald J. Remboski, Dearborn; Steven L. Plee, Brighton; Mark B. Woznick; John F. Foley, both of Novi, all of Mich.

[73] Assignee: Motorola Inc., Schaumburg, Ill.

[21] Appl. No.: 511,331

[22] Filed: Aug. 3, 1995

[51] Int. Cl.$^{6}$ .................................................. G01M 3/26

[52] U.S. Cl. ......................... 73/40.5 R; 73/49.2; 73/49.7

[58] Field of Search ............................... 73/40.5 R, 49.2, 73/40, 49.7, 118.1; 123/518, 519

[56] References Cited

U.S. PATENT DOCUMENTS

| | | | |
|---|---|---|---|
| 3,465,562 | 9/1969 | Donohoe | 73/40 |
| 3,786,671 | 1/1974 | Caron | 73/40 |
| 3,800,586 | 4/1974 | Delatorre et al. | 73/49.2 |
| 3,962,905 | 6/1976 | Jouve | 73/40.5 R |
| 4,012,944 | 3/1977 | Covington et al. | 73/40.5 R |
| 4,012,945 | 3/1977 | Bergstrand | 73/49.2 |
| 4,078,421 | 3/1978 | Gastaldo et al. | 73/49.2 |
| 4,091,658 | 5/1978 | Covington et al. | 73/40.5 R |
| 4,144,743 | 3/1979 | Covington et al. | 73/40.5 R |
| 4,587,619 | 5/1986 | Converse, III et al. | 364/552 |
| 4,660,519 | 4/1987 | Stocker et al. | 123/339 |
| 4,663,962 | 5/1987 | Tagesson | 73/40.7 |
| 4,708,014 | 11/1987 | Janitz | 73/37 |
| 4,791,805 | 12/1988 | Gates | 73/40.7 |
| 4,854,158 | 8/1989 | Gates | 73/45.5 |
| 4,876,530 | 10/1989 | Hill et al. | 340/605 |
| 4,905,501 | 3/1990 | Sawatani | 73/40 |
| 4,993,256 | 2/1991 | Fukuda | 73/49.2 |
| 5,107,698 | 4/1992 | Gillia | 73/40.7 |
| 5,187,974 | 2/1993 | Mellits et al. | 73/49.7 |
| 5,408,866 | 4/1995 | Kawamura et al. | 73/40 |
| 5,467,641 | 11/1995 | Williams et al. | 73/49.7 |

FOREIGN PATENT DOCUMENTS 0196132 8/1986 Japan .

*Primary Examiner*—Michael Brock
*Attorney, Agent, or Firm*—Nicholas C. Hopman

[57] ABSTRACT

A apparatus and method of detecting a leak in an evaporative emissions system measures vapor flow out of the evaporative emissions system while maintaining a zero pressure difference from inside a fuel tank to atmosphere and provides a reference vapor flow variable dependent on the measurement (317). A pressurized vapor and leak flow variable is measured (323) dependent on measured vapor flow out of the evaporative emissions system while maintaining a pressure difference of 10" of water from inside the fuel tank to atmosphere. A leak is indicated (327) if a difference between the reference vapor flow variable and the pressurized vapor and leak flow variable is greater than a predetermined leak flow factor.

10 Claims, 2 Drawing Sheets

APPARATUS AND METHOD OF DETECTING A LEAK IN AN EVAPORATIVE EMISSIONS SYSTEM

FIELD OF THE INVENTION

This invention is generally directed to the field of vehicular emissions control and in particular to detection of leaks in an evaporative emissions system.

BACKGROUND OF THE INVENTION

Contemporary vehicles including passenger cars, light duty trucks, and medium duty vehicles use evaporative emissions systems to prevent unnecessary emission of hydrocarbon (HC) vapors into the atmosphere. These emissions are primarily composed of gasoline vapors leaking from a vehicle's fuel tank to the air. In a typical system, the fuel tank is periodically vented into a canister filled with charcoal that filters the HC vapors and releases the filtered air to the atmosphere. The charcoal traps the hydrocarbon molecules from the polluting vapors, preventing them from leaking to the atmosphere.

Near term regulation requires the monitoring of the vehicle's evaporative emission system to ensure integrity of operation. This requirement specifies, among other things, checking of the absence of leaks in the system. More specifically, the California Air Resources Board, CARB, specifies in their proposed On Board Diagnostic II, or OBD II, requirement to check the evaporative emissions system for leaks. This requires detecting system leaks equivalent to an office larger than 0.020 inches in diameter for vehicles produced in model year 2000.

A prior art for scheme for detecting leaks measures a re-pressurization time. In this case the evaporative emissions system's vent to atmosphere is closed, and then a weak vacuum (DP=10 inches of water) is drawn on the fuel tank—waiting to see how long the fuel tank takes to re-pressurize. If the fuel tank takes a long time to re-pressurize, then there are no significant leaks. If the fuel tank re-pressurizes quickly then a significant leak is indicated. There are several problems with this scheme including a length of the re-pressurization time. With a relatively small leak and a nearly empty tank, the re-pressurization time can be unacceptably long. Furthermore, the amount of space above the fuel varies with fuel level, and the corresponding change in fuel tank volume causes the re-pressurization time to vary as a function of fuel level. Also, inaccuracies can be caused by fuel evaporation during the leak test. With high volatility (winter) fuel, on a warm day fuel evaporation generates vapor at a rate that exceeds the amount of gas flow generated by 10 inches of water across a 0.020 inch hole. This can cause false leak detection on warm days when the fuel tank contains high volatility fuel. Additionally, in some fuel tanks, the 10 inches of water vacuum drawn on the fuel tank during the test causes the fuel tank to flex. This causes the fuel tank to hold vacuum for a longer period of time during re-pressurization.

Another prior art scheme uses a positive displacement pump to pressurize the fuel tank with air and measure the air flow with the fuel tank pressurized. Safety is at issue here because the air pumped into the fuel tank may cause an explosion hazard. This scheme is subject to the same problems with high volatility fuel on warm days as other prior art schemes and has the potential of increasing HC emissions during a test of a leaky system.

What is needed is an improved method of detecting a leak in an evaporative emissions system for a vehicle that is safer and more accurate than prior art schemes.

DETAILED DESCRIPTION OF A PREFERRED EMBODIMENT

A apparatus and method of detecting a leak in an evaporative emissions system measures vapor flow out of the evaporative emissions system while maintaining a zero pressure difference from inside a fuel tank to atmosphere and provides a reference vapor flow variable dependent on the vapor flow measurement. Then, a pressurized vapor and leak flow variable is measured dependent on measured vapor flow out of the evaporative emissions system while maintaining a pressure difference of 10" of water from inside the fuel tank to atmosphere. A leak is indicated if a difference between the reference vapor flow variable and the pressurized vapor and leak flow variable is greater than a predetermined leak flow factor. By swamping out any effects caused by vapor flow very small leaks can be accurately detected. Certain aspects of the invention can be better understood in reference to the accompanying figures.

Figure 1:
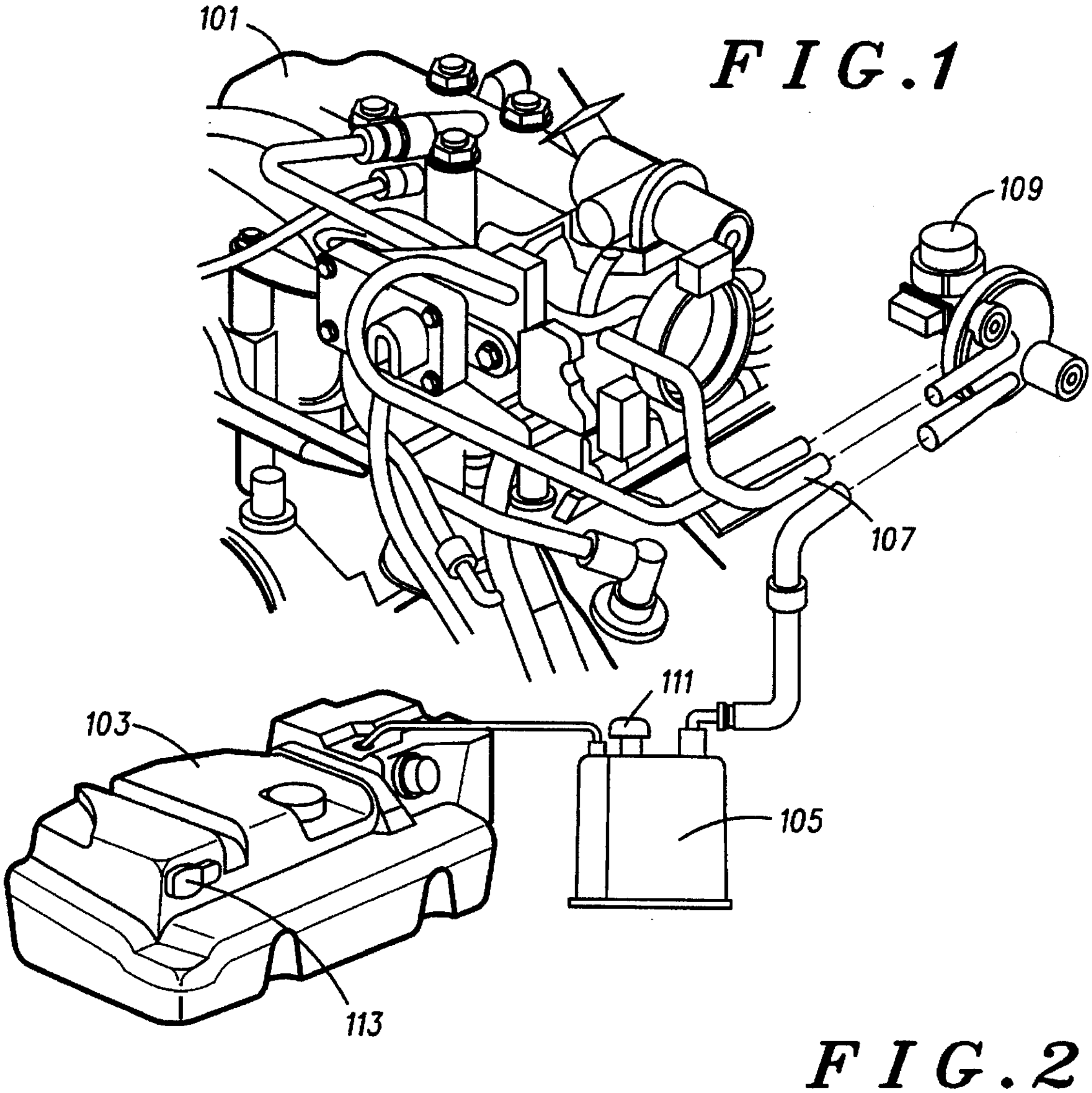
FIG. 1 is a schematic diagram of a reciprocating engine with an evaporative emissions system.

FIG. 1 is a schematic diagram of a reciprocating engine with an evaporative emissions system. An engine 101 is fueled from fuel residing in a fuel tank 103. Because some of the fuel in the fuel tank 103 is in gaseous form it periodically needs to be vented to prevent a dangerous buildup of pressure. While controlling any excessive pressure buildup in the fuel tank 103 it is also vital not to emit hydrocarbons, HCs, to the atmosphere. The fuel tank 103 pressure can be vented using an evaporative emissions system as illustrated here. While the engine 101 is not operating, the fuel tank 103 is vented through the evaporative capture canister 105. When the engine is operating, the captured fuel vapor in the evaporative capture canister 105 is inducted into the engine 101 and burned. Burning the captured fuel vapor is done by inducting the vapor in the evaporative capture canister 105 into the intake manifold 107 of the engine 101 via a flow regulation valve 109.

Figure 2:
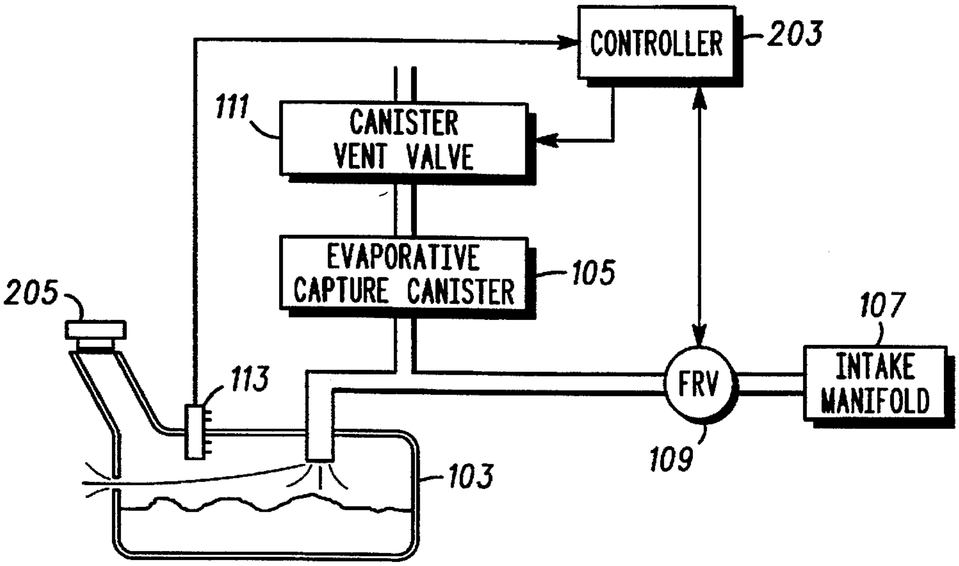
FIG. 2 is a schematic diagram of an evaporative emissions system with a detectable leak in accordance with an embodiment of the invention.

In prior art schemes that draw vacuum on fuel tank and measure re-pressurization time, fuel vaporization can raise the tank pressure in the absence of a leak. Thus making a leak indistinguishable from normal fuel vaporization. This is one reason why prior art systems are ineffective. In the preferred embodiment, a flow rate in the system is measured while a DP across the fuel tank is zero. Note that DP is a differential pressure measured comparing the atmospheric pressure outside the fuel tank with a pressure inside the fuel tank. The measured flow rate is indicative of a vapor generation rate only. Because the DP across the tank in zero, there is no flow through any leaks in the tank. The next step is to measure the flow rate at another DP across the tank. This is done by pulling the vacuum on the fuel tank using the engine. At the lower DP flow will develop through any leaks in the tank in addition to flow due to vapor generation. Next, the two flow measurements are subtracted, the result being indicative of leak flow, so the vapor flow is canceled out. This allows very small leaks to be detected. FIG. 2 is a schematic representation of the evaporative emission system introduced in FIG. 1.

In addition to the earlier introduced elements, a controller 203 is used to operate certain elements. Preferably, the controller 203 is constructed using a Motorola 68HC705B6 microcontroller. The Motorola 68HC705B6 microcontroller includes on-board program memory in the form of EPROM (Erasable Programmable Read Only Memory), and an analog to digital converter to interpret a pressure signal from a DP sensor 113. This type of controller 203 is easily constructed by those skilled in the art. Later, in FIG. 3 a flow chart is presented that symbolically describes the various method steps encoded into the controller's program memory. Note that the controller 203 is connected to the flow regulation valve 109 for coupling the intake manifold 107 to the fuel system, and for measuring the flow generated by the fuel tank 103. The controller 203 also manages the canister vent valve 111, and measures the DP across the fuel tank 103 via the DP sensor 113.

Now that all the major elements of the system have been introduced, a working example will be described using both FIGS. 2 and 3.

Figure 3:
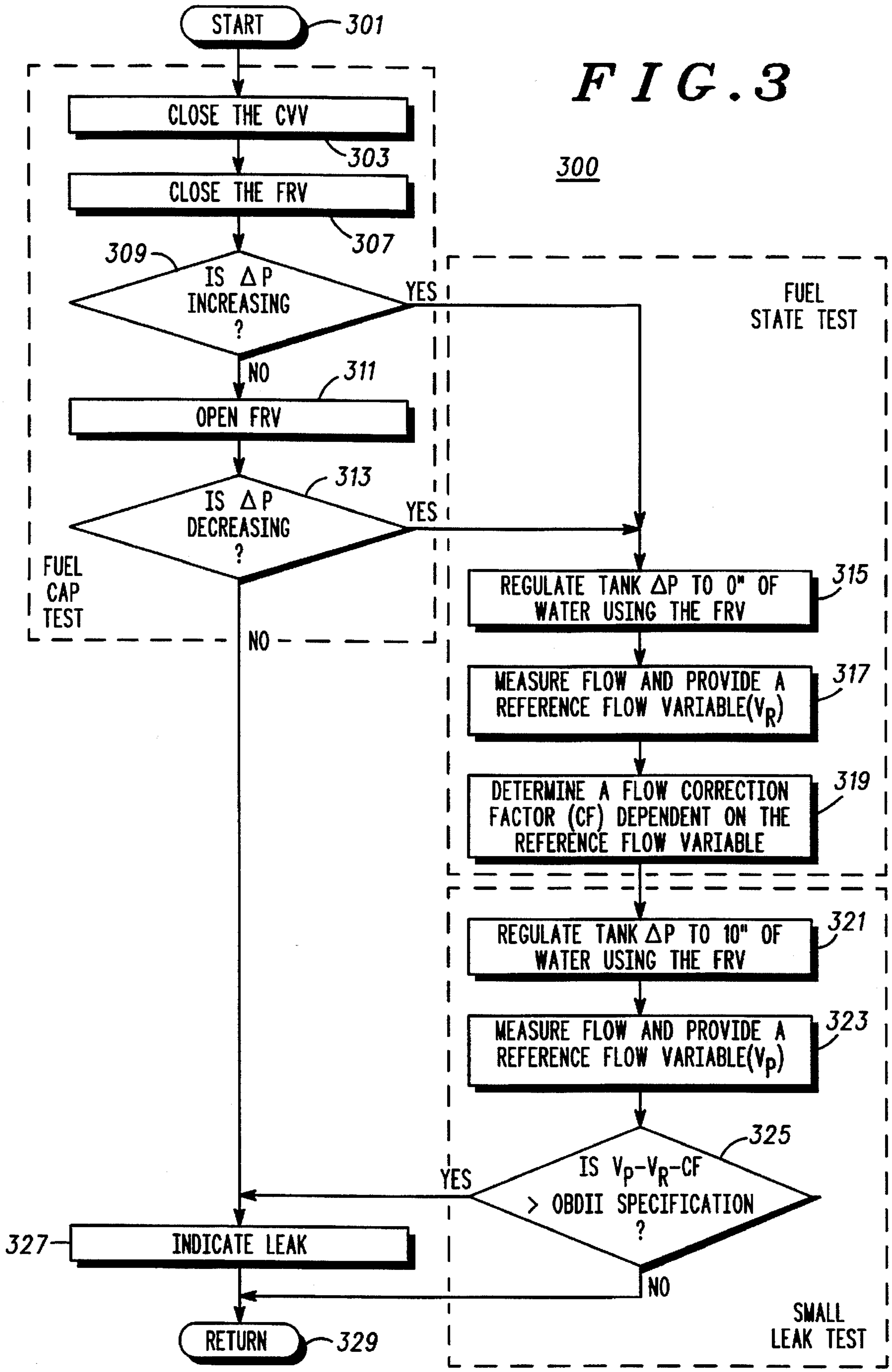
FIG. 3 is a flow chart illustrating various preferred method steps.

First, referring to FIG. 3, the leak test is essentially broken into three major sections, a fuel cap test, a fuel state test, and a small leak test. The method steps associated with these three major sections are encoded into the controller 203 of FIG. 2 and are executed whenever the leak test is invoked. Of the three major tests shown in FIG. 3, the first is entitled the fuel cap test. This test is a gate to the other two tests in FIG. 3 and essentially checks to see if a fuel cap 205 in FIG. 2 is on the fuel tank 103. If the fuel cap 205 is on the fuel tank 103, the next test is to determine a state of the fuel. Essentially, the fuel state test is a vapor generation test. A rate of vapor generation is related to a temperature and volatility of the fuel. Following the fuel state test, is a small leak test which searches for a small leak in the fuel tank.

Testing commences in a step 301. In the next step 303, the canister vent valve 111 is closed by the controller 203.

Then in step 307, the flow regulation valve 109 is closed by the controller 203. Closure of the flow regulation valve 109 cuts off any path for vapor flow into the intake manifold 107 of the engine.

Next in step 309, the controller checks to see if the pressure indicated by the DP sensor 113 is increasing. This checking is typically done over three or four seconds. If there is any vapor generation, the pressure indicated by the DP sensor 113 will increase measurably. If the DP measurement is increasing, there is a pressure build up in the fuel tank and it is inferred that the fuel cap 205 is intact. If in step 309 it is determined that the signal generated by the DP sensor 113 is not increasing, it can't be said for sure that the fuel cap 205 is on or off and further tests are executed.

The next portion of the fuel cap test, step 311, is executed by opening the flow regulation valve 109 to attempt to draw a vacuum on the fuel tank 103 using the engine 101 via the intake manifold 107. In step 313, the output signal of the DP sensor 113 is monitored and checked to see if DP is decreasing. If DP is decreasing, it is likely that there are no large leaks and the fuel state test is initiated. If DP is not decreasing, then the fuel cap 205 is assumed to be off or a large leak is present. If it is determined that the fuel cap 205 is off then step 327 is executed and the routine 300 is exited at step 329.

A first step 315 in the fuel state test is to regulate the DP in the fuel tank 103 to a first pressure—here zero inches of water using the flow regulation valve 109.

Next, in step 317 vapor flow is measured using the flow regulation valve 109, and reference flow variable VR is provided based on the vapor flow measurement.

Then, in step 319, a flow correction factor may optionally be applied depending on the reference flow variable. This adjusts for the slight increase in vapor generation when the tank pressure is lowered. The correction factor is derived empirically and may be a function of the reference variable.

Next in step 321, the fuel tank DP is regulated down to a second pressure—here 10 inches of water below atmospheric pressure using the flow control measurement device 103.

Then in step 323, the vapor flow is again measured and a pressurized flow variable VP is provided based on the vapor flow measurement.

Next, in step 325 if VP - VR - CF indicates flow due to a leak greater than the OBD II specification, then a leak is indicated in step 327. If VP - VR - CF is not greater than the OBD II specification, then a leak is not indicated and the routine is exited at step 329. Step 325 essentially swamps out the effect of vapor flow on the small leak test. This is a significant departure from prior art approaches and enables a more accurate and reliable leak test in an evaporative emissions system.

The steps above measure flow for a relatively short period of time typically 15 seconds. During this time the vapor flow is relatively constant, but certain factors may cause the vapor flow to fluctuate. Statistical processing or filtering can be used to account for these fluctuations. In particular, vehicle motion agitating the fuel and fuel tank flex cause fluctuations. The vehicle motion agitates the fuel, which causes increased vapor generation. This results in abnormally high vapor generation for a short period of time. Fuel tank flex causes a transient flow into or out of the fuel tank unrelated to leaks. A lowpass filter or median filter can be used to reject these transients. Alternatively, the tests shown in FIG. 3 are preferably aborted if a significant amount of fuel slosh is detected to minimize inaccuracies. Fuel slosh can be caused by the vehicle traversing across a rough road. Fuel slosh can be measured using the DP sensor 113. Preferably, a standard deviation of regularly measured DP measurements is used to determine fuel sloshing behavior.

The above-described approach overcomes problems with varying vapor generation due to fuel volatility and temperature by measuring vapor generation in the absence of leak flow and subtracting this effect from a subsequent measurement of leak flow. In the described approach the time to run the test is independent of the fuel level, fuel volatility, fuel temperature and leak size. The new method is also immune to errors caused by changes in fuel level because the flow rate due to vapor generation or due to a leak is unchanged by the amount of space above the fuel in the tank. Also, because the new monitor measures flow at it fixed vacuum, fuel tank flex is also constant and does not change the flow measurement.

In summary, the invention consists of the three steps enumerated above followed by filtering or statistical processing the resulting signal to remove unwanted transient noise. Additionally, the fuel state measurement may be of value to the engine's air-fuel ratio control system. Beneficially, the above-described approach is offers significantly better accuracy than prior art systems because it accounts variations in fuel vapor generation rate due to changes in fuel volatility and fuel temperature. This approach also accounts for changes in the vapor space above the liquid fuel in the fuel tank that cause errors in the prior art repressurization type systems. The described approach is safer and more accurate than prior art approaches.

What is claimed is:

1. A method of detecting a leak in an evaporative emissions system for a vehicle, the method comprising the steps of:

measuring vapor flow out of the evaporative emissions system while maintaining a substantially zero pressure difference from inside a fuel tank to atmosphere and providing a reference vapor flow variable dependent on the measurement;

measuring vapor flow out of the evaporative emissions system while maintaining another pressure difference from inside the fuel tank to atmosphere and providing a pressurized vapor and leak flow variable dependent on the measurement;

indicating a leak if a difference between the reference vapor flow variable and the pressurized vapor and leak flow variable is greater than a predetermined leak flow factor.

2. A method in accordance with claim 1 wherein the step of maintaining a substantially zero pressure difference between atmosphere and the fuel tank further comprise the steps of:

measuring a standard deviation of the pressure difference between atmosphere and the fuel tank; and aborting the remaining method steps if the measured standard deviation exceeds a predetermined threshold.

3. A method of detecting a leak in an evaporative emissions system for a vehicle, the method comprising the steps of:

closing an evaporative capture canister vent valve positioned between a fuel tank and atmosphere;

regulating a pressure difference between atmosphere and the fuel tank to zero inches of water by controlling a flow regulation valve positioned between the fuel tank and an engine intake manifold;

measuring flow using the flow regulation valve and providing a reference flow variable;

determining a flow correction factor dependent on the reference flow variable for a pressure difference between atmosphere and the fuel tank of ten inches of water;

regulating a pressure difference between atmosphere and the fuel tank to ten inches of water by controlling a flow regulation valve;

measuring flow using the flow regulation valve and providing a pressurized flow variable; and indicating a leak dependent on the reference flow variable, the flow correction factor, and the pressurized flow variable.

4. A method in accordance with claim 3 wherein the step of indicating a leak comprises the steps of:

determining a leak flow variable dependent on a difference between the pressurized flow variable and both the reference flow variable and the flow correction factor; and indicating the leak if the leak flow variable exceeds a predetermined threshold.

5. A method in accordance with claim 3 wherein the steps of regulating a pressure difference between atmosphere and the fuel tank further comprise the steps of:

measuring a standard deviation of the pressure difference between atmosphere and the fuel tank; and aborting the remaining steps if the measured standard deviation exceeds a predetermined threshold.

6. An apparatus for detecting a leak in an evaporative emissions system for a vehicle, the apparatus comprising:

a flow regulation valve for measuring vapor flow out of the evaporative emissions system while maintaining a first, substantially zero pressure difference from inside a fuel tank to atmosphere and providing a reference vapor flow variable dependent on the measurement, and the flow regulation valve for measuring vapor flow out of the evaporative emissions system while maintaining a second pressure difference from inside the fuel tank to atmosphere and providing a pressurized vapor and leak flow variable dependent on the measurement;

a controller for indicating a leak if a difference between the reference vapor flow variable and the pressurized vapor and leak flow variable is greater than a predetermined leak flow factor.

7. A apparatus in accordance with claim 6 wherein the controller further comprises:

means for measuring a standard deviation of the second pressure difference between atmosphere and the fuel tank; and aborting the leak indication if the measured standard deviation exceeds a predetermined threshold.

8. An apparatus for detecting a leak in an evaporative emissions system for a vehicle, the apparatus comprising:

means for closing an evaporative capture canister vent valve positioned between a fuel tank and atmosphere;

means for regulating a pressure difference between atmosphere and the fuel tank to zero inches of water by controlling a flow regulation valve positioned between the fuel tank and an engine intake manifold;

means for measuring flow using the flow regulation valve and providing a reference flow variable;

means for determining a flow correction factor dependent on the reference flow variable for a pressure difference between atmosphere and the fuel tank of ten inches of water;

means for regulating a pressure difference between atmosphere and the fuel tank to ten inches of water by controlling a flow regulation valve;

means for measuring flow using the flow regulation valve and providing a pressurized flow variable; and means for indicating a leak dependent on the reference flow variable, the flow correction factor, and the pressurized flow variable.

9. A method in accordance with claim 8 wherein the means for indicating a leak further comprises:

means for determining a leak flow variable dependent on a difference between the pressurized flow variable and both the reference flow variable and the flow correction factor; and wherein the means for indicating the leak indicates a leak if the leak flow variable exceeds a predetermined threshold.

10. An apparatus in accordance with claim 9 wherein the controller further comprises:

means for measuring a standard deviation of the pressure difference between atmosphere and the fuel tank; and aborting the leak indication if the measured standard deviation exceeds a predetermined threshold.

* * * * *